US012585780B2

(12) United States Patent
Admon et al.

(10) Patent No.: US 12,585,780 B2
(45) Date of Patent: Mar. 24, 2026

(54) SECURE STACKING OF MEMORY DIES

(71) Applicant: WINBOND ELECTRONICS CORPORATION, Taichung City (TW)

(72) Inventors: Itay Admon, Pardes Hanna (IL); Nir Tasher, Herzliya (IL)

(73) Assignee: Winbond Electronics Corporation, Park Taichung City (TW)

( * ) Notice: Subject to any disclaimer, the term of this patent is extended or adjusted under 35 U.S.C. 154(b) by 266 days.

(21) Appl. No.: 18/339,249

(22) Filed: Jun. 22, 2023

(65) Prior Publication Data

US 2024/0427897 A1     Dec. 26, 2024

(51) Int. Cl.
*G06F 13/16*          (2006.01)
*G06F 21/57*          (2013.01)

(52) U.S. Cl.
CPC ........ *G06F 21/575* (2013.01); *G06F 13/1668* (2013.01); *G06F 2213/16* (2013.01); *G06F 2221/033* (2013.01)

(58) Field of Classification Search
CPC ............... G06F 21/575; G06F 13/1668; G06F 2213/16; G06F 2221/033; G06F 13/4291; G06F 21/79; G06F 13/1684; G06F 13/1694; G06F 3/0622; G06F 3/0659; G06F 13/4068; G06F 13/1605; G06F 13/40; G11C 5/04; G11C 8/12; G11C 5/063; G11C 7/1048
USPC ........................................................ 711/163
See application file for complete search history.

(56) References Cited

U.S. PATENT DOCUMENTS

| | | | |
|---|---|---|---|
| 7,126,873 | B2 | 10/2006 | See et al. |
| 7,434,018 | B2 | 10/2008 | Oh et al. |
| 8,488,391 | B2 | 7/2013 | Mochizuki et al. |
| 9,063,849 | B2 | 6/2015 | Lee et al. |
| 9,245,590 | B2 | 1/2016 | Chen et al. |
| 9,344,091 | B2 | 5/2016 | Jayasena et al. |
| 9,348,786 | B2 | 5/2016 | Gillingham |
| 9,747,994 | B2 | 8/2017 | Narai et al. |
| 10,431,292 | B2 | 10/2019 | King |
| 10,885,971 | B2 | 1/2021 | Best et al. |

(Continued)

OTHER PUBLICATIONS

Winbond Electronics Corporation America, "SpiStack Memories—Winbond's W25M Series SpiStack," Product Brief, pp. 1-2, Mar. 2023.

*Primary Examiner* — Jared I Rutz
*Assistant Examiner* — Wei Ma
(74) *Attorney, Agent, or Firm* — Meitar Patents Ltd.; Daniel Kligler

(57)          ABSTRACT

An IC includes a primary memory die and a secondary memory die. The primary memory die is coupled to a bus providing a primary Chip Select (CS) signal via a primary CS line that connects to the primary memory die. The secondary memory die is coupled to the bus, excluding the primary CS line, and to a secondary CS line carrying a secondary CS signal provided by the primary memory die. The primary memory die is configured to receive a command over the bus, while the primary CS signal is active, in response to identifying that the command is destined to the primary memory die, to execute the command within the primary memory die, and in response to identifying that the command is destined to the secondary memory die, to cause the secondary memory die to execute the command by transferring the primary CS signal on the secondary CS line.

24 Claims, 3 Drawing Sheets

(56) References Cited

U.S. PATENT DOCUMENTS

| | | | |
|---|---|---|---|
| 11,194,726 B2 | 12/2021 | Gans | |
| 2013/0119542 A1 | 5/2013 | Dh | |
| 2014/0245384 A1* | 8/2014 | Shieh | H04L 9/0894 |
| | | | 726/2 |
| 2015/0310203 A1* | 10/2015 | Shieh | G06F 21/44 |
| | | | 726/2 |
| 2021/0224195 A1* | 7/2021 | O | G06F 12/0292 |
| 2023/0038894 A1* | 2/2023 | Lu | G11C 29/26 |
| 2023/0162766 A1* | 5/2023 | Jo | G11C 5/04 |
| | | | 365/189.05 |
| 2023/0259627 A1* | 8/2023 | Santan | G06F 13/1642 |
| | | | 726/26 |
| 2023/0333778 A1* | 10/2023 | Giduturi | G06F 3/0679 |
| 2023/0395566 A1* | 12/2023 | Vankayala | H01L 25/50 |

* cited by examiner

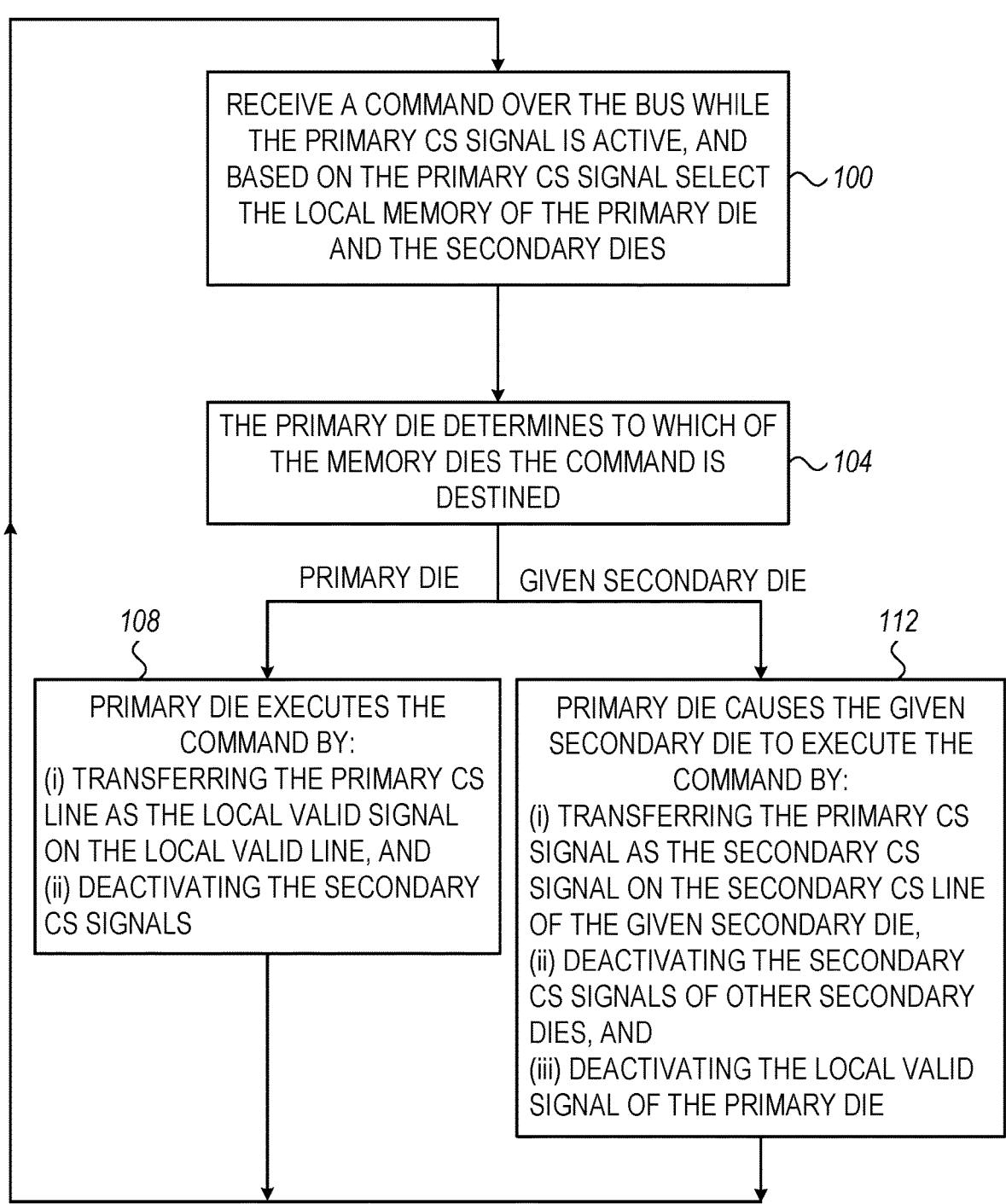

RECEIVE A COMMAND OVER THE BUS WHILE THE PRIMARY CS SIGNAL IS ACTIVE, AND BASED ON THE PRIMARY CS SIGNAL SELECT THE LOCAL MEMORY OF THE PRIMARY DIE AND THE SECONDARY DIES ∿ 100

THE PRIMARY DIE DETERMINES TO WHICH OF THE MEMORY DIES THE COMMAND IS DESTINED ∿ 104

PRIMARY DIE        GIVEN SECONDARY DIE

108

PRIMARY DIE EXECUTES THE COMMAND BY:
(i) TRANSFERRING THE PRIMARY CS LINE AS THE LOCAL VALID SIGNAL ON THE LOCAL VALID LINE, AND
(ii) DEACTIVATING THE SECONDARY CS SIGNALS

112

PRIMARY DIE CAUSES THE GIVEN SECONDARY DIE TO EXECUTE THE COMMAND BY:
(i) TRANSFERRING THE PRIMARY CS SIGNAL AS THE SECONDARY CS SIGNAL ON THE SECONDARY CS LINE OF THE GIVEN SECONDARY DIE,
(ii) DEACTIVATING THE SECONDARY CS SIGNALS OF OTHER SECONDARY DIES, AND
(iii) DEACTIVATING THE LOCAL VALID SIGNAL OF THE PRIMARY DIE

FIG. 2

SECURE STACKING OF MEMORY DIES

TECHNICAL FIELD

Embodiments described herein relate generally to secure data storage, and particularly to methods and systems for secure storage in a multi-die package.

BACKGROUND

Various systems store data in a storage device comprising multiple memory dies stacked in a common package.

Using memory dies stacked in a common package is known in the art. For example, as described in U.S. Pat. No. 9,245,590, any number of Serial Peripheral Interface ("SPI") flash memory dies may be stacked and packaged to realize any one or combination of various capabilities such as low per-bit cost, high density storage, code shadowing to RAM, and fast random access for "execute in place" applications, while preserving the advantages of the SPI interface. During device manufacture, each of the stacked dies is assigned a unique identifier or "Die ID" relative to the other stacked dies in the package. During normal operations, the unique Die IDs are used by a Die Select command to enable one of the stacked dies to respond to subsequent commands on the SPI interface, while disabling the other stacked die in the package from responding to subsequent commands for certain "Universal" commands which include the Die Select command. Concurrent operations by the stacked die are supported.

As another example, U.S. Pat. No. 11,194,726 describes methods, systems, and devices for stacked memory dies and combined access operations. A device may include multiple memory dies. One die may be configured as a master, and another may be configured as a slave. The master may communicate with a host device. A slave may be coupled with the master but not the host device. The device may include a first die (e.g., master) and a second die (e.g., slave). The first die may be coupled with a host device and configured to output a set of data in response to a read command. The first die may supply a first subset of the data and obtain a second subset of the data from the second die.

SUMMARY

An embodiment that is described herein provides an Integrated Circuit (IC) that includes a primary memory die and a secondary memory die. The primary memory die is coupled to a bus providing a primary Chip Select (CS) signal via a primary CS line that connects to the primary memory die. The secondary memory die is coupled to the bus, excluding the primary CS line, and to a secondary CS line carrying a secondary CS signal provided by the primary memory die. The primary memory die is configured to receive a command over the bus, while the primary CS signal is active, in response to identifying that the command is destined to the primary memory die, to execute the command within the primary memory die, and in response to identifying that the command is destined to the secondary memory die, to cause the secondary memory die to execute the command by transferring the primary CS signal, as the secondary CS signal, on the secondary CS line.

In some embodiments, the primary memory die includes a local memory selectable by a local Valid signal carried on a local Valid line, and the primary memory die is configured to execute the command by (i) transferring the primary CS signal as the local Valid signal on the local Valid line, and (ii)

deactivating the secondary CS signal provided to the secondary memory die. In other embodiments, the IC includes another secondary die coupled to the bus excluding the primary CS line, and to another secondary CS line carrying another secondary CS signal provided by the primary memory die, and the primary die is configured to cause the other secondary die to execute the command, by (i) transferring the primary CS signal, as the other secondary CS signal, on the other secondary CS line, (ii) deactivating the secondary CS signal provided to the secondary die, and (iii) deactivating the local Valid signal provided to the local memory of the primary die. In yet other embodiments, the primary memory die and the secondary memory die are of respective first and second different memory types, each selected from a list including at least: (i) a NAND Flash memory type, and (ii) a NOR Flash memory type.

In an embodiment, the primary memory die and the secondary memory die support respective first and second different access protocols, and the primary memory die is configured to present to a host coupled to the bus the second access protocol of the secondary memory die. In another embodiment, the primary memory die is configured to, in response to receiving a die-selection command specifying a selected memory die between the primary memory die and the secondary memory die, cause the selected memory die to execute one or more commands received subsequently to the die-selection command. In yet another embodiment, the primary memory die and the secondary memory die are mapped to different respective address subranges of a common address space, and the primary memory die is configured to identify an address parameter in the received command, and to execute the received command by the primary memory die or by the second memory die depending on the address range to which the address parameter belongs.

In some embodiments, the primary memory die is configured to operate in accordance with an access mode in which the primary memory die controls the second CS signal to block access to the secondary memory die for all incoming commands. In other embodiments, the primary memory die is configured to operate in accordance with an access mode in which the primary memory die controls the second CS signal to allow access to the secondary memory die for a partial subset of the commands supported by the secondary memory die. In yet other embodiments, the primary memory die is configured to operate in accordance with an access mode in which the primary memory die controls the second CS signal to allow full access to the secondary memory die for all commands supported by the secondary memory die, while selectively executing only commands that modify the access mode.

In an embodiment, the primary memory die is configured to locally store a boot code of a host coupled to the bus, and to manage secure access to the stored boot code. In another embodiment, the primary memory die is configured to serve as a Root of Trust (ROT) of an underlying system comprising the IC, for securing storage operations destined to the secondary memory die.

There is additionally provided, in accordance with an embodiment that is described here, a method for data storage, including, in an Integrated Circuit (IC) that a includes a primary memory die, coupled to a bus providing a primary Chip Select (CS) signal via a primary CS line that connects to the primary memory die, and a secondary memory die coupled to the bus, excluding the primary CS line, and to a secondary CS line carrying a secondary CS signal provided by the primary memory die, receiving a command by the primary memory die, over the bus, while the primary CS signal is active. In response to identifying that the command is destined to the primary memory die, the command is executed within the primary memory die, and in response to identifying that the command is destined to the secondary memory die, the secondary memory die is caused to execute the command by transferring the primary CS signal, as the secondary CS signal, on the secondary CS line.

These and other embodiments will be more fully understood from the following detailed description of the embodiments thereof, taken together with the drawings in which:

BRIEF DESCRIPTION OF THE DRAWINGS

FIG. 2 is a flow chart that schematically illustrates a method for execution of a command in a multi-die storage device, in accordance with an embodiment that is described herein.

DETAILED DESCRIPTION OF EMBODIMENTS

Overview

Figure 1:
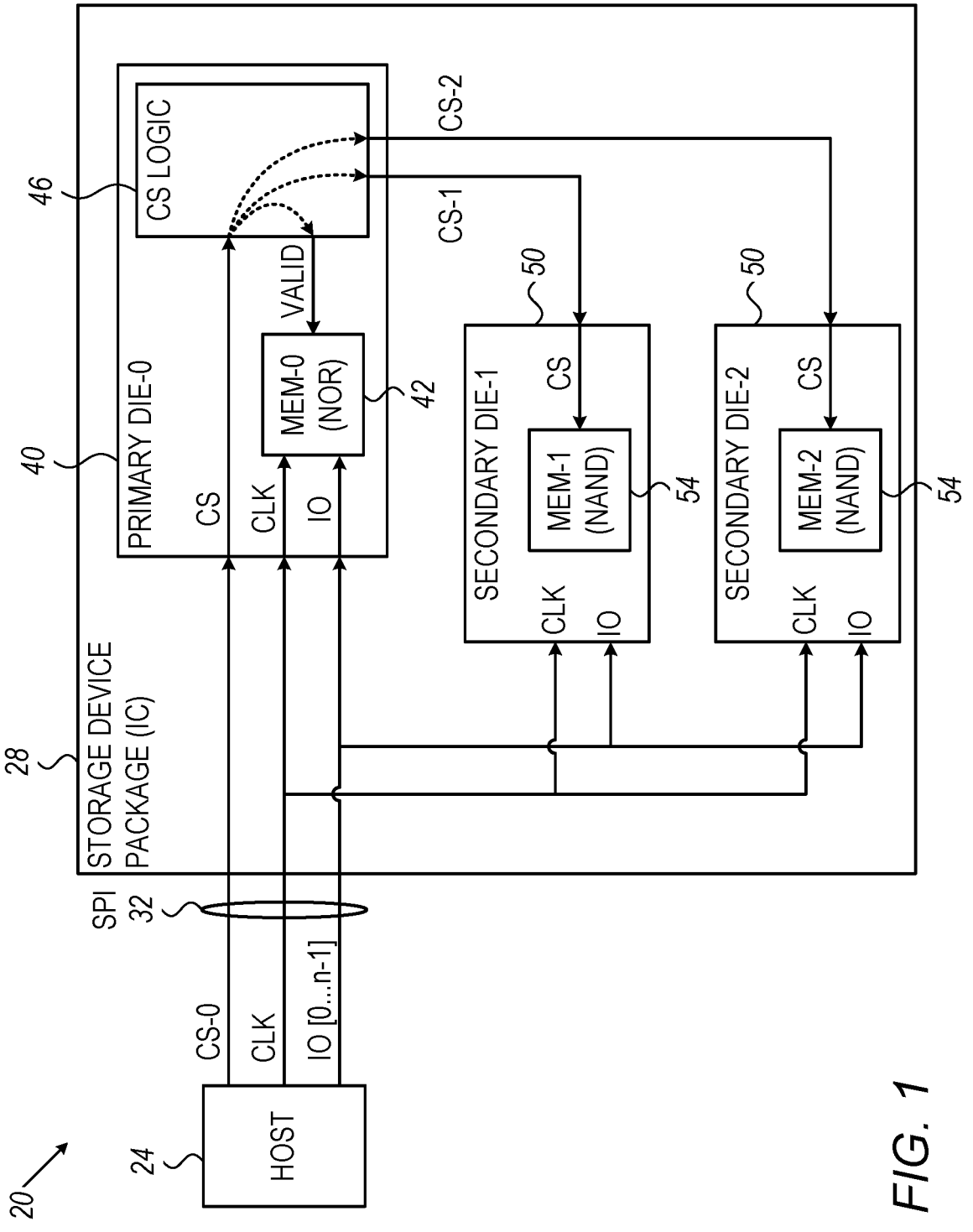
FIG. 1 is a block diagram that schematically illustrates a computer system comprising multiple memory dies stacked within a common package, in accordance with an embodiment that is described herein.

Embodiments that are described herein provide improved methods and systems for managing secure access to multiple memory dies stacked in a common package. In the disclosed embodiments, one memory die controls access to the other memory dies by controlling their respective Chip Select (CS) inputs. The disclosed embodiments are applicable to memory dies of different types, having different respective command sets, and/or supporting different access protocols.

In various systems, a host is coupled via a bus to a storage device comprising multiple memory dies. The bus typically comprises one or more Input/Output (IO) lines for carrying opcodes, addresses, and data, and a CS signal that becomes active during the commands.

Each of the memory dies has a CS input that when active selects that memory die for executing a corresponding command. A memory die can complete execution of a supported command when its CS input is active during the entire command and will typically abandon command execution if the CS input becomes inactive before execution completes. A memory die typically ignores an unsupported command even when its CS input is active during the entire command.

Various architectures may be used for accessing individual memory dies within the package. For example, the entire bus signals, including the bus CS signal, may be coupled to all the memory dies in parallel. Technology of this sort is provided by Winbond under the name SpiStack® and is implemented within Winbond's W25M product family. When a command is sent over the bus, all the memory dies initially receive the command, and each of the memory dies independently decides whether to execute or abandon the command. This parallel bus approach typically requires that the memory dies would have the same memory type and share common rules for deciding on command execution or abandon, and is therefore unsuitable when mixing memory dies of different types within the package.

In another approach, the host bus could be coupled to a mediating controller that terminates the host bus and generates separate bus signals, including respective CS signals, to the different memory dies. The host can communicate with each of the memory dies only indirectly via the controller. This approach is typically highly complex and costly because the controller handles multiple full buses for the respective memory dies.

In the disclosed embodiments, a bus is coupled in parallel to multiple memory dies, excluding the CS signal that is connected only to one of the memory dies, referred to herein as a "primary memory die". The primary memory die controls access to the other memory dies, also referred to herein as "secondary dies", by providing a separate CS signal to each of the secondary dies.

Consider an Integrated Circuit (IC), comprising a primary memory die and one or more secondary memory dies. The primary memory die is coupled to a bus providing a primary Chip Select (CS) signal via a primary CS line that connects only to the primary memory die. The secondary memory dies are coupled to the bus, excluding the primary CS line, and to respective secondary CS lines carrying respective secondary CS signals provided by the primary memory die. The primary memory die receives a command over the bus, while the primary CS signal is active, and in response to identifying that the command is destined to the primary memory die, executes the command within the primary memory die. Otherwise, in response to identifying that the command is destined to the secondary memory die, the primary memory die causes a given secondary memory die to execute the command by transferring the primary CS signal, as the secondary CS signal, on the secondary CS line of the given secondary memory die.

In the description that follows, for the sake of clarity, some of the embodiments that will be described below refer to a package that includes a primary memory die and a single secondary die. The disclosed techniques are similarly applicable, however, to packages that include multiple secondary memory dies.

In some embodiments, the primary memory die comprises a local memory selectable by a local "Valid signal" carried on a local "Valid line," and the primary memory die executes the command by (i) transferring the primary CS signal as the local Valid signal on the local Valid line, and (ii) deactivating the secondary CS signal provided to the secondary memory die.

In other embodiments the IC comprises another secondary die coupled to the bus excluding the primary CS line, and to another secondary CS line carrying another secondary CS signal provided by the primary memory die. In these embodiments, the primary die causes the other secondary die to execute the command, by (i) transferring the primary CS signal, as the other secondary CS signal, on the other secondary CS line, (ii) deactivating the secondary CS signal provided to the secondary die, and (iii) deactivating the local Valid signal provided to the local memory of the primary die.

In the disclosed architecture, at least some memory dies among the primary memory die and secondary memory die(s), may be of different respective memory types, each selected from a list comprising at least: (i) a NAND Flash memory type, and (ii) a NOR Flash memory type.

In an embodiment, the primary memory die and the secondary memory die support respective first and second different access protocols, and wherein the primary memory die presents to a host coupled to the bus the second access protocol of the secondary memory die.

The primary memory die may select a target memory die for executing a received command (or one or more subsequent commands) using any suitable method, e.g., based on a dedicated die-selection command, or on address information included in the command.

In some embodiments, the primary die can operate in one of three access modes, namely a "Standalone" mode, a "Restricted-Access" mode, and a "Full-Access mode". In the Standalone mode, the primary memory die controls the to block access to the secondary second CS signal(s) memory die(s) incoming commands. In the for all Restricted-Access mode, the primary memory die controls the second CS signal(s) to allow access to the secondary memory die(s) for a partial subset of the respective commands supported by the secondary memory die(s). In the Full-Access mode, the primary memory die controls the second CS signal(s) to allow full access to the secondary memory die(s) for all commands supported by the secondary memory die(s), while selectively executing (by the primary memory die) only commands that modify the access mode.

The disclosed architecture can be used, for example, for secure booting. In an example such embodiment, the primary memory die locally stores a boot code of a host coupled to the bus and manages secure access to the stored boot code, e.g., in storing, updating, and uploading the boot code.

In an embodiment, the primary memory die serves as a Root of Trust (ROT) of an underlying system comprising the IC, for securing storage operations destined to the secondary memory die. For example, the primary memory die may provide write protection and various cryptographic services to the secondary memory dies such as encryption and data authentication.

In the disclosed techniques, a primary memory die controls access to secondary memory dies by controlling their respective CS inputs. The disclosed architecture and related embodiments result in low-complexity, low power consumption, and fast access to the secondary memory dies. Moreover, memory dies of different storage technologies, such as mixing Flash NOR die(s) and Flash NAND die(s) within the same package is supported. Since the primary die manages per command die selection, the memory dies need not obey common rules and/or otherwise cooperate with one another for selecting a target die, which results in a simplified and flexible implementation.

System Description

FIG. 1 is a block diagram that schematically illustrates a computer system 20 comprising multiple memory dies stacked within common package, in a accordance with an embodiment that is described herein.

Computer system 20 comprises a host 24 coupled to an Integrated Circuit (IC) 28, implementing a storage device in the present example, via a bus 32 (also referred to as a link or interface). Bus 32 comprises multiple (e.g., a number 'n' of) Input/Output (IO) lines, a Clock line denoted "CLK", and a Chip Select (CS) line denoted "CS-0". Bus 32 may comprise, for example, a Serial Peripheral Interface (SPI). Alternatively, other suitable bus types can be used, such as, for example, the extended SPI, the Expanded SPI (xSPI), and the Inter-Integrated Circuit ($I^2C$) bus.

In computer system 20, host 24 typically communicates commands with storage device 28 over bus 32, The communication may include sending an opcode, sending an address, and sending and/or receiving data.

Computer system may be used in various 20 for example, Internet of Things applications such as, (IoT) devices, automotive applications, PC/Server Basic Input-Output System (BIOS), Industrial controllers, and the like.

Storage device 28 comprises a memory die 40 denoted "DIE-0" comprising a local memory 42 and CS logic 46. Memory die 40 is also referred to herein as a "primary memory die" or just a "primary die" for brevity. Storage device 28 further comprises one or more memory dies 50, each of which comprises a memory 54. Memory dies 50 are denoted "DIE-m", wherein 'm' denotes an integer larger than 0. Memory dies 50 are also referred to herein as "secondary memory dies" or just "secondary dies" for brevity.

The primary die and each of the secondary dies has a CS input, that when active, selects the corresponding memory die. It is noted that selecting a memory die means gaining access to the internal memory of that memory die. Although in FIG. 1 storage device 28 comprises two secondary dies denoted DIE-1 and DIE-2, in alternative embodiments, the storage device may comprise a single secondary die or more than two secondary dies.

In the architecture of FIG. 1, the CLK line and the IO lines of bus 32 connect between host 24 and each of the primary and secondary dies, in parallel. In contrast, the CS-0 line of bus 32, also referred to herein as a "primary CS line", connects between the host and the CS input of the primary die, but not to the CS inputs of the secondary dies. A memory selection line, also referred to herein as a "Valid line" connects between the CS logic and local memory 42. CS lines denoted "CS-1" and "CS-2", also referred to herein as "secondary CS lines", connect between the CS logic and CS inputs of respective secondary dies. The architecture described above allows CS logic 46 to control access to its local memory (42) and to the secondary dies (50) and their memories (54).

In the description that follows, a CS signal carried on the primary CS line is also referred to herein as a "primary CS signal", a CS signal carried on a secondary CS line is also referred to herein as a "secondary CS signal", and a memory select signal carried on the Valid line is also referred to herein as a "Valid signal". As will be described below, the CS logic controls the Valid signal for accessing local memory 42 of the primary die and controls the secondary CS signals for accessing the secondary dies.

Local memory 42 of the primary die 40 and memories 54 of secondary dies 50 may comprise memories of any suitable type. In the present example, local memory 42 of DIE-0 comprises a NOR Flash device, whereas memories 54 of DIE-1 and DIE-2 comprise NAND Flash devices. In other embodiments, however, any other suitable combination of memory types can also be used. For example, local memory 42 of the primary die and memories 54 of all the secondary dies may be of the same memory type. As another example, two (or more) memories 54 of the secondary dies may have different respective memory types. Although in the present context the memory types mainly used are NOR dies and NAND dies, this is not mandatory, and other suitable memory types (volatile or nonvolatile) can also be used.

When host 24 sends a command over the bus, the primary die controls the Valid signal and the secondary signals so that the command is initially received by the primary die and by all the secondary dies, while the primary CS signal (sent on the CS-0 line) is active. As the command progresses (e.g., after receiving the opcode parameter, the CS logic determines a target die to which the command is destined, and controls the Valid signal and the secondary CS signals so that the command will be executed by the target die and abandoned by all other memory dies.

Methods for determining a target die will be described in detail below.

Execution of Commands in a Multi-Die Storage Device

FIG. 2 is a flow chart that schematically illustrates a method for execution of a command in a multi-die storage device, in accordance with an embodiment that is described herein. The method will be described as executed by primary die (DIE-0) of storage device 28 in FIG. 1. The method of FIG. 2 is applicable, for example, when all the memory dies in the storage device support the same set of commands and command format.

The method begins, at a command reception step 100, with DIE-0 receiving from host 24 a command over bus 32. The command is carried on the bus IO lines using the bus CLK signal. Moreover, the primary CS signal carried on the primary CS line (CS-0) is assumed to be active during the command.

In response to the primary CS signal, CS logic 46 of DIE-0 initially selects local memory 42 and all the secondary dies 50 (DIE-1 and DIE-2 in this example). To this end, the CS logic transfers the primary CS signal, as the Valid signal, on the internal Valid line, and transfers the primary CS signal, as secondary CS signals, on the secondary CS lines of the secondary dies. Consequently, local memory 42 of DIE-0 and memories 54 of the secondary dies receive at least the opcode parameter of the command, and therefore, each of the primary die and the secondary dies is ready for executing the command if selected as the target die.

At a die selection step 104, the CS logic of DIE-0 determines a target die to which the command is destined. DIE-0 may determine the target die based, for example, on information carried in the opcode parameter and/or in an address parameter (if available) in the present or previous command.

When at step 104 DIE-0 is selected as the target die, the method proceeds to a primary die execution step 108. Otherwise, DIE-1 or DIE-2 is the target die, and the method proceeds to a secondary die execution step 112.

At step 108 DIE-0 executes the command by the CS logic (i) transferring the (active) primary CS signal, as the Valid signal, on the local Valid line of local memory 42, and (ii) deactivating the secondary CS signals of all the secondary dies (DIE-1 and DIE-2 in this example). Since the secondary dies are deselected, the secondary dies abandon execution of the command.

At step 112, DIE-0 causes the target die (DIE-1 or DIE-2 in this example) to execute the command by the CS logic (i) transferring the primary CS signal, as the secondary CS signal, on the secondary CS line of the target die, (ii) deactivating the secondary CS signals of other secondary dies, and (iii) deactivating the local Valid signal of DIE-0.

Deactivating the Valid signal or a secondary CS signal can be carried out using any suitable method, e.g., using a logical OR gate when the signal is low-active, or using a logical AND gate when the signal is high-active.

Following each of steps 108 and 112, the method loops back to step 100 to receive a subsequent command.

The method of FIG. 2 is given by way of example, and other suitable methods can also be used. For example, when the command comprises only an opcode command, e.g., a configuration command, the primary die may control the Valid signal and the secondary CS signals so that multiple memory dies execute the command in parallel to one another.

Figure 3:
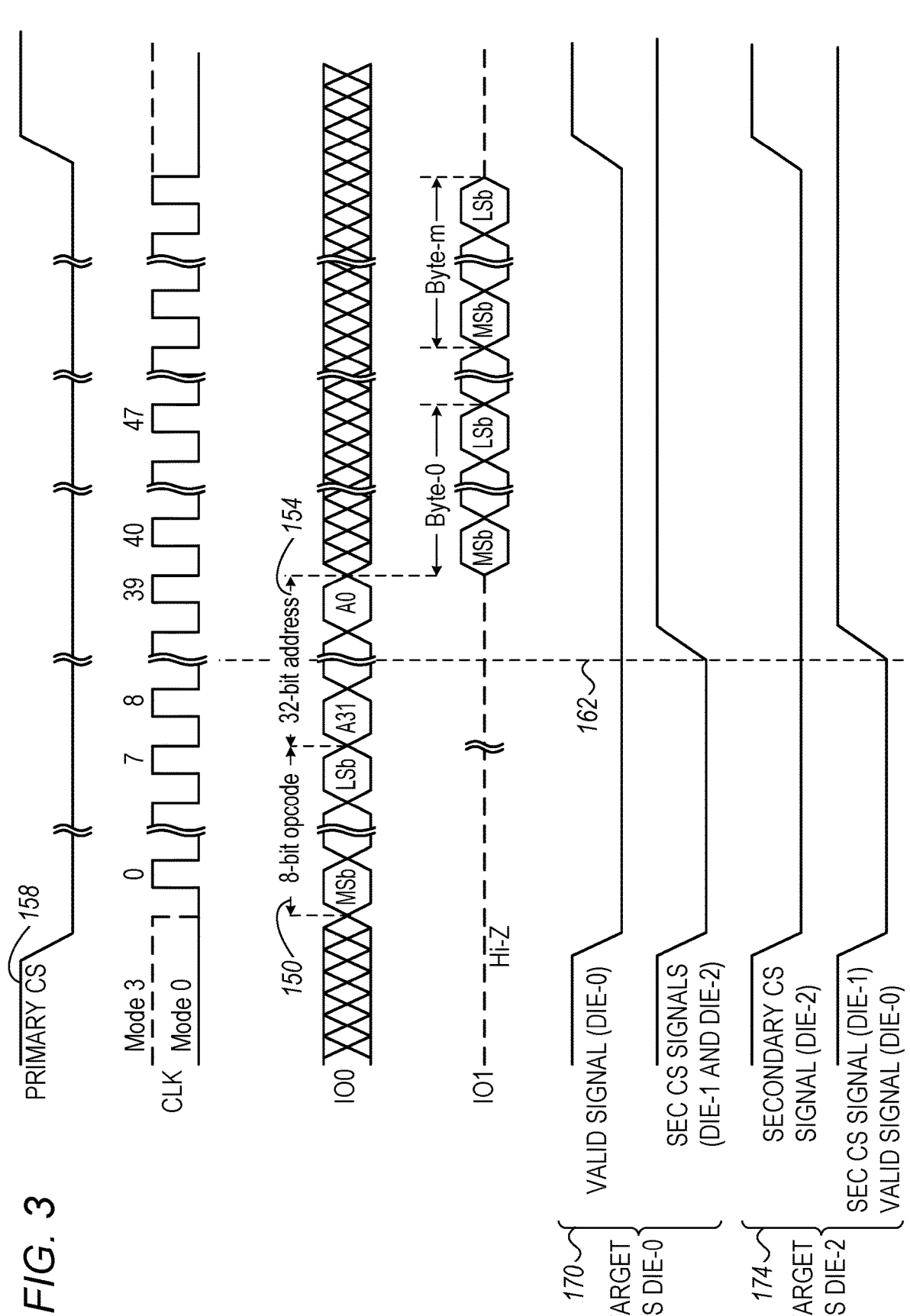
FIG. 3 is a timing diagram that schematically illustrates signals generated during execution of a read command in a multi-die storage device, in accordance with an embodiment that is described herein.

FIG. 3 is a timing diagram that schematically illustrates various signals generated during execution of a read command in a multi-die storage device, in accordance with an embodiment that is described herein. The timing diagram will be described for a system (e.g., 20) in which host 24 performs the read command, e.g., using the method of FIG. 2.

In the present example, bus 32 comprises an SPI having an IO0 line for sending commands to storage device 28 and an IO1 line for receiving data from the storage device. As shown in the figure, the command has an 8-bit opcode parameter 150 that is sent starting with the Most Significant bit (MSb) and ending with the Least Significant bit (LSb). The opcode parameter is followed by a 32-bit address parameter 154 that is sent starting with the highest address bit (A31) and ending with the lowest address bit (A0). In response to the read command, the storage device sends Byte-0 . . . . Byte-m of data read from the target die back to the host, over the 101 line.

A primary CS signal 158 is sent from the host over the primary CS line (CS-0) of the bus becomes active during the command. In the example of FIG. 3, the primary CS signal becomes active (e.g., changes from a high level to a low level in this example) just before the MSb of the opcode starts and remains active until the memory device completes sending the $m^{th}$ data byte over the 101 line.

In the example of FIG. 3, it is assumed that DIE-0 determines the target die at a time instance 162, based on some of the upper address bits of the address parameter. The timing diagram depicts the Valid signal and secondary CS signals in cases in which (i) the target die is the primary die DIE-0 (170) and (ii) the target die is the secondary die DIE-2 (174).

When the primary CS 158 signal becomes active, the CS logic initially transfers the primary CS signal, as the Valid signal, on the Valid line of DIE-0, and as secondary signals, on the secondary CS lines of both DIE-1 and DIE-2. This enables all the memory dies to receive the opcode parameter and at least part of the address parameter.

When the DIE-0 is the target die, the CS logic continues transferring the primary CS signal as the Valid signal on the Valid line. In addition, the CS logic causes DIE-1 and DIE-2 to abandon the command by deactivating the secondary CS signals of the secondary dies. When DIE-2 (for example) is the target die, the CS logic causes DIE-2 to execute the command by transferring the primary CS signal as the secondary signal on the secondary CS line of DIE-2. DIE-0 also causes DIE-1 and DIE-0 to abandon the command by respectively deactivating the secondary CS signal of DIE-1 and the Valid signal of DIE-0.

The timing diagram illustrated in FIG. 3 and described above is cited by way of example. Other suitable timing diagrams may be used in alternative embodiments. For example, in some embodiments the bus-width operating mode may be Quad or Octal, and additional IO lines may be added, accordingly. In this case multiple bits of the command would be transmitted per each clock cycle. Although FIG. 3 illustrates a 32-bit address parameter, other address lengths such as a 24-bit address can also be used. As another example, although the timing diagram in FIG. 3 depicts low-active CS signals, in alternative embodiments, high-active CS signals can also be used.

Methods for Determining a Target Die

Upon receiving a command by storage device 28, the primary die determines (e.g., using CS logic 46) which of the memory dies within the storage device is to execute the command. The memory die selected for executing a given command is referred to herein as the "target die" for the given command. The target die may be the primary die or one of the secondary dies. In general, a sequence of commands may contain commands that are destined to the same memory die or to two or more different memory dies. In the disclosed embodiments, primary die 40 (DIE-0) handles the selection of a single target die for each command.

The primary die can determine the target die for a given command in various ways, as will be described below. In one embodiment, each of the memory dies is preassigned a respective die identifier, and the primary die selects a target die in response to receiving a dedicated die-selection command specifying the identifier of the target die. The dedicated command may specify the die identifier, e.g., within the opcode parameter or in a separate parameter following the opcode parameter. The die-selection command is processed by the primary die but is not part of the command set supported by the secondary dies and is therefore ignored by the secondary dies.

In an embodiment, in response to the die-selection command, the primary die controls the Valid signal and the secondary CS signals so that subsequent commands will be executed by the target die (and typically not by other dies). The primary die continues monitoring commands subsequently received, even when the target die is a secondary die, and upon receiving another die-selection command, reselects the target die accordingly.

Some commands such as read, program and erase commands, contain an address parameter. For such commands, the primary die can determine the target die based on the address parameter. In this method, the primary die and the secondary dies are mapped into a common address space that is partitioned into multiple address subranges, wherein each of the memory dies is mapped into a respective address subrange of the address space. In some embodiments, upon receiving a command that has an address parameter, the primary die determines the target die based on at least part of the address parameter, e.g., the Most Significant (MS) byte of the address, by identifying the address subrange to which the address parameter belongs. Address-based target die selection as described above, is applicable, but not limited to, storage devices in which all the memory dies share the same set of commands and command formats.

As described in FIG. 1 above, a storage device may include the memory dies of various memory types that comply with different sets of commands, different command formats and/or different access protocols, e.g., when mixing NOR and NAND Flash devices within the same storage device. In such embodiments, the host accessing target dies needs to use commands from the set of commands supported by the respective target dies. Alternatively or additionally, the primary die may present to the host an access protocol used by a secondary die having a memory type different from that of the primary die. This allows the host to communicate with all memory dies using a common access protocol.

Consider, for example, performing a read operation in storage device 28 in which the primary die is a NOR Flash device, and the secondary dies are NAND Flash devices. The read (or a write) command of a NOR Flash device typically carries the full address parameter for direct access (e.g., a 24-bit or a 32-bit memory address). In contrast, a read operation applied to a NAND Flash device is typically indirect and includes a "Page-Load" command followed by one or more "Page-Read" commands. Within the target NAND device, the Page-Load command loads a page from memory into a local read buffer (not shown) of the target NAND device. The page may contain several Kbytes of data (e.g., 4 Kbytes or any other suitable size). A Page-Read command reads data from the read buffer that was loaded by the preceding Page-Load command. The Page-Load command typically carries significant bits of the address only the 16 most parameter (e.g., A31 . . . . A16), whereas the Page-Read command typically carries only the 16 low significant bits of the address parameter (e.g., A15 . . . . A0). In the present example, the primary die selects a given target die when the address part carried in the Page-Load command falls within the subrange allocated to the given target die.

The Page-Load command is typically executed by all the secondary NAND dies. After determining a NAND target die, the primary die controls the Valid signal and the secondary CS signals so that subsequent Page-Read commands are executed only by the target NAND die and abandoned by the primary die and by other secondary dies. Moreover, the primary die monitors subsequent commands received over the bus, and upon detecting a subsequent Page-Load command, reselects a target die based on the address parameter carried in that subsequent Page-Load command.

Additional Considerations and Features

Additional implementation considerations and features will be described hereinbelow.

When two or more memory dies have different respective storage sizes, various address mappings can be used. Consider, for example, a storage device comprising a 128-Megabit primary NOR die and one or more 1-Gigabit secondary NAND dies. Such an architecture is applicable, for example, for storing a relatively small boot code in the NOR device and extending the overall storage space using the secondary NAND dies.

In one such embodiment, the primary die can be mapped to an address subrange beyond the address subranges assigned to the secondary NAND dies. For example, in case of a single 1 Gigabit secondary NAND die, the NAND die is mapped to an address subrange range 0000_0000h-07FF_FFFFh and the 128-Megabit primary NOR die is mapped to an address range 0800_0000h-08FF_FFFFh.

In another embodiment, the address subrange assigned to the primary NOR die overlaps the address range assigned to the secondary NAND dies. For example, the 128-Megabit primary NOR die is mapped to the address subrange given by 0000_0000h-00FF_FFFFh, and the single 1-Gigabit secondary NAND die is mapped to the address subrange given by 0100_0000h-07FF_FFFFh. In this case, the lower 128 Megabit addresses of the secondary die are inaccessible.

In some embodiments the primary die (NOR) presents to the host an access protocol of the secondary dies (NAND). To this end, the primary die (NOR) implements the Page-Load and Page-Read commands of the NAND dies, so that a host having a NAND Flash controller can access the primary die (NOR) and the secondary dies (NAND) using the same command set and format least (at for read operations). In these embodiments, the local memory of the primary die (NOR) appears to the host as a NAND device and therefore the software running by the host can access the memories in the storage device as accessing a monolithic (single die) NAND Flash memory device. In some embodiments, before accessing the primary die in NAND format or any of the secondary NAND dies, the host is required to load, e.g., from the storage device, a suitable driver designed to access NAND memories.

Certain commands may be too short to allow enough time for the primary die to determine the target die based on the address parameter. For example, a block Erasure command of a NAND device issued in the xSPI Octal Dual Transfer Rate (DTR) bus mode (also referred to as an "8d-8d-8d" mode-meaning that the command, address, and data transfers are 8 bits wide DTR), requires one clock cycle for the opcode followed by an additional clock cycle for the address. In this case, the secondary dies may undesirably execute the Erasure command (in response to the opcode and address parameter) before the primary die determines the target die based on the address parameter. In some embodiments, to avoid such false command execution, the primary die restricts usage of the address-based target selection method to selected commands (e.g., only to Read operations), and blocks commands that may result in false execution (e.g., Erasure operations and Program operations).

It is noted that unlike the erase and program commands, in a read command, the die continues processing the command after receiving the address, prepares the response, and then starts transmitting the response back to host, which leaves sufficient time for terminating the command by dies other than the target die.

In some embodiments, commands that modify the content stored in the storage device, such as Program commands and Erasure commands, are preceded by a Write-Enable command. The primary die monitors the commands received over the bus, and upon detecting a Write-Enable command (or other qualifying conditions) while the target die is one of the secondary dies, the primary die blocks further access to the secondary dies, e.g., until the following system reset, or depending on a predefined flow implemented within the primary die. The primary die thus blocks any sequence of commands that starts with a Write-Enable command and followed by a Program or Erase command, meaning that the secondary dies are essentially write-protected. The primary die thus manages write protection of the secondary dies, even when the secondary dies themselves do not support inherent write protection mechanisms.

In some embodiments, the primary die supports security functions that may be used for providing write protection (and other security features) to the secondary dies, even when the secondary dies do not support inherent security functions. For example, the primary die may perform a secured command that is protected, e.g., by a signature, password and/or other user-authentication mechanisms, to gain access to the secondary dies.

In some embodiments the primary die supports access modes selectable from multiple predefined modes. In an example embodiment, the primary die supports a threefold access mode comprising (i) a "Standalone mode", (ii) a "Restricted-Access" mode and (iii) a "Full-Access" mode. In an embodiment, primary die 40 switches among the access modes by the control of host 24.

In the Standalone mode, the primary die allows access only to its local memory and blocks access to any of the secondary dies. This mode is useful, for example, in systems in which the host boots from the primary die (e.g., a NOR Flash device). In the Standalone mode, the primary die selects itself as the target die for all incoming commands, and therefore need not determine the target die on the fly.

After the boot process completes, the primary die may be switched to the Restricted-Access mode, in which the primary die (e.g., NOR) allows access to the secondary dies (e.g., NANDs) for certain commands that contain an address parameter (e.g., read access). In the Restricted-Access mode, the primary die may present to the host an access protocol of the secondary dies as described above.

In the Full-Access mode, the primary die allows access to the secondary dies for all supported commands. This mode may be used to program, erase, and/or configure the secondary dies. In the Full-Access mode, the primary die monitors the received commands, and responses only to storage commands that modify the access mode to the Restricted-Access mode or to the Standalone mode.

In some embodiments, the Standalone mode serves as a default access mode after reset. In such embodiments, in response to a reset event, the primary die automatically starts operating in the Standalone mode, allowing the host to boot from the primary die (e.g., NOR). At a suitable later time, e.g., after the boot completes, the host loads from the storage device Firmware (FW) code containing a driver for accessing NAND dies, and switches to the Restricted-Access or to the Full-Access mode. In other embodiments, the Restricted-Access mode or the Full-Access mode may serve as the default mode after reset. In this case, after reset, the primary die starts operating in the Restricted-Access mode or in the Full-Access mode. This embodiment is useful, for example, when the host boots from the secondary dies rather than from the primary die.

In an example embodiment, the primary die comprises a secure device stacked in the same package with one or more secondary dies. In such embodiments, the primary die serves as the Root of Trust (ROT) of the system. The storage device can rely on the secure functions of the primary die to store, protect and update the boot code stored in the primary die.

The embodiments described above are given by way of example, and other suitable embodiments can also be used. For example, although some of the embodiments above refer to a storage device comprising a NOR primary die and one or more NAND secondary dies, this architecture is not mandatory, and in other embodiments, other suitable combinations of NOR, NAND, and/or other memory types can also be used.

The configurations of computer system 20, including host 24, storage device 28 and its components such as primary die 40, local memory 40 and CS logic 46, and secondary dies 50 and their memories 54 are example configurations that are shown purely for the sake of conceptual clarity. Any other suitable computer, host and memory dies configurations can be used in alternative embodiments.

The different sub-units of storage device 28 may be implemented using suitable hardware, such as in one or more Application-Specific Integrated Circuits (ASICs) or Field-Programmable Gate Arrays (FPGAs), using software, using hardware, or using a combination of hardware and software elements.

Storage device 28 may comprise one or more general-purpose processors, which are programmed in software to carry out the functions described herein. The software may be downloaded to the processor(s) in electronic form, over a network or from a host, for example, or it may, alternatively or additionally, be provided and/or stored on non-transitory tangible media, such as magnetic, optical, or electronic memory.

It will be appreciated that the embodiments described above are cited by way of example, and that the claims are not limited to what has been following particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Circuit (IC), comprising:
a primary memory die, which is connected to a bus comprising multiple signals including a Chip Select (CS) signal; and
a secondary memory die, which is connected to the multiple signals of the bus except for the CS signal,
wherein the primary memory die comprises (i) a local memory, and (ii) CS logic, the CS logic configured to:
receive a command over the bus while the CS signal is active;
in response to identifying that the command is destined to the primary memory die, connect the CS signal to the local memory and not to the secondary memory die, thereby causing the primary memory die to execute the command; and
in response to identifying that the command is destined to the secondary memory die, connect the CS signal to the secondary memory die and not to the local memory, thereby causing the secondary memory die to execute the command.

2. The IC according to claim 1, wherein the IC comprises another secondary die connected to the multiple signals of the bus except for the CS signal, and wherein the primary die is configured to cause the other secondary die to execute the command, by connecting the CS signal to the other secondary memory die, and not to the local memory or to the secondary memory die.

3. The IC according to claim 1, wherein the primary memory die and the secondary memory die are of respective first and second different memory types, each selected from a list comprising at least: (i) a NAND Flash memory type, and (ii) a NOR Flash memory type.

4. The IC according to claim 1, wherein the primary memory die and the secondary memory die support respective first and second different access protocols, and wherein the primary memory die is configured to present to a host coupled to the bus the second access protocol of the secondary memory die.

5. The IC according to claim 1, wherein the primary memory die is configured to, in response to receiving a die-selection command specifying a selected memory die between the primary memory die and the secondary memory die, cause the selected memory die to execute one or more commands received subsequently to the die-selection command.

6. The IC according to claim 1, wherein the primary memory die and the secondary memory die are mapped to different respective address subranges of a common address space, and wherein the primary memory die is configured to identify an address parameter in the received command, and to execute the received command by the primary memory die or by the secondary memory die depending on the address range to which the address parameter belongs.

7. The IC according to claim 1, wherein the primary memory die is configured to operate in accordance with an access mode, in which the primary memory die controls the CS signal provided to the secondary memory die to block access to the secondary memory die for all incoming commands.

8. The IC according to claim 1, wherein the primary memory die is configured to operate in accordance with an access mode, in which the primary memory die controls the CS signal provided to the secondary memory die to allow access to the secondary memory die for a partial subset of the commands supported by the secondary memory die.

9. The IC according to claim 1, wherein the primary memory die is configured to operate in accordance with an access mode in which the primary memory die controls the CS signal provided to the secondary memory die to allow full access to the secondary memory die for all commands supported by the secondary memory die, while selectively executing only commands that modify the access mode.

10. The IC according to claim 1, wherein the primary memory die is configured to locally store a boot code of a host coupled to the bus, and to manage secure access to the stored boot code.

11. The IC according to claim 1, wherein the primary memory die is configured to provide write protection and/or cryptographic services to an underlying system comprising the IC, for securing storage operations destined to the secondary memory die.

12. The IC according to claim 1, wherein the CS logic is configured to:
before selecting which memory die is to execute the command, enable both the primary memory die and the secondary memory die to receive an opcode of the command and begin execution of the command, by connecting the CS signal to both the primary memory die and the secondary memory die; and
after selecting which memory die is to execute the command, disconnect the CS signal from a memory die that was not selected, thereby causing the memory die that was not selected to abandon execution of the command.

13. A method for data storage, comprising:
in an Integrated Circuit (IC) comprising (i) a primary memory die, which is connected to a bus comprising multiple signals including a Chip Select (CS) signal, and (ii) a secondary memory die, which is (a) connected to the multiple signals of the bus except for the CS signal,
receiving, by CS logic in the primary memory die, a command over the bus, while the CS signal is active;
in response to identifying that the command is destined to the primary memory die, connecting the CS signal, using the CS logic, to the local memory and not to the secondary memory die, thereby causing the primary memory die to execute the command; and
in response to identifying that the command is destined to the secondary memory die, connect the CS signal to the secondary memory die and not to the local memory, using the CS logic, thereby causing the secondary memory die to execute the command.

14. The method according to claim 13, wherein the IC comprises another secondary die connected to the multiple signals of the bus except for the CS line, and comprising causing the other secondary die to execute the command, by connecting the CS signal, using the CS logic, to the other secondary memory die, and not to the local memory or to the secondary memory die.

15. The method according to claim 13, wherein the primary memory die and the secondary memory die are of respective first and second different memory types, each selected from a list comprising at least: (i) a NAND Flash memory type, and (ii) a NOR Flash memory type.

16. The method according to claim 13, wherein the primary memory die and the secondary memory die support respective first and second different access protocols, and comprising presenting, by the primary die, to a host coupled to the bus, the second access protocol of the secondary memory die.

17. The method according to claim 13, wherein in response to receiving a die-selection command specifying a selected memory die between the primary memory die and the secondary memory die, causing the selected memory die to execute one or more commands received subsequently to the die-selection command.

18. The method according to claim 13, wherein the primary memory die and the secondary memory die are mapped to different respective address subranges of a common address space, and comprising identifying an address parameter in the received command, and executing the received command by the primary memory die or by the secondary memory die depending on the address range to which the address parameter belongs.

19. The method according to claim 13, and comprising operating in accordance with an access mode, in which the primary memory die controls the CS signal provided to the secondary memory die to block access to the secondary memory die for all incoming commands.

20. The method according to claim 13, and comprising operating in accordance with an access mode, in which the primary memory die controls the CS signal provided to the secondary memory die to allow access to the secondary memory die for a partial subset of the commands supported by the secondary memory die.

21. The method according to claim 13, and comprising operating in accordance with an access mode, in which the primary memory die controls the CS signal provided to the secondary memory die to allow full access to the secondary memory die for all commands supported by the secondary memory die, while selectively executing only commands that modify the access mode.

22. The method according to claim 13, and comprising locally storing a boot code of a host coupled to the bus, and managing secure access to the stored boot code.

23. The method according to claim 13, and comprising providing write protection and/or cryptographic services, by the primary memory die, to an underlying system comprising the IC, for securing storage operations destined to the secondary memory die.

24. The method according to claim 13, further comprising, using the CS logic:

before selecting which memory die is to execute the command, enabling both the primary memory die and the secondary memory die to receive an opcode of the command and begin execution of the command, by connecting the CS signal to both the primary memory die and the secondary memory die; and after selecting which memory die is to execute the command, disconnecting the CS signal from a memory die that was not selected, thereby causing the memory die that was not selected to abandon execution of the command.

\* \* \* \* \*